United States Patent [19]

Lapin et al.

[11] 4,016,739

[45] Apr. 12, 1977

[54] METHOD OF SHAPING RING BLANKS

[76] Inventors: Vladimir Viktorovich Lapin, ulitsa Khlopina 7, korpus 2, kv. 18, Leningrad; Boris Sergeevich Bulgakov, ulitsa Sharikopodshipnikovaya 36/18, kv. 291, Moscow; Konstantin Nikolaevich Bogoyavlensky, ulitsa Khlopina 7, korpus 2, kv. 12, Leningrad; Jury Lvovich Rozhdestvensky, Ierusalimsky proezd 4, kv. 12, Moscow; Simon Pavlovich Granosky, Volzhsky bulvar 30, kv. 39, Moscow; Genrikh Semenovich Maizelis, Leninsky prospekt 90, kv. 176, Moscow; Vladimir Ivanovich Lazutin, ulitsa Zoologicheskaya 30, kv. 3, Moscow; Ilya Alexandrovich Sauskan, ulitsa 7 Parkovaya 33, korpus 1, kv. 27, Moscow, all of U.S.S.R.

[22] Filed: Dec. 8, 1975

[21] Appl. No.: 638,975

[52] U.S. Cl. .............................. 72/105; 29/148.4 R
[51] Int. Cl.[2] .......................................... B21H 1/12
[58] Field of Search ................. 72/102, 105, 106; 29/148.4 R

[56] References Cited

UNITED STATES PATENTS 3,857,147  12/1974  Gerat ................................ 29/148.4

Primary Examiner—Lowell A. Larson
Attorney, Agent, or Firm—Lackenbach, Lilling & Siegel

[57] ABSTRACT

The method of this invention produces a ring blank with a desired shape of an inner surface thereof from a ring having a plain inner surface and a profiled outer surface.

The blank is shaped between two rolls, the inner one being cambered and the outer one being flat.

Said camber is identical to the prescribed shape of the blank to be produced. The proposed method is an improvement on the prior art in that it takes less effort to produce intricate inner shapes as well as to shape several rings, such as raceways, simultaneously, if same should be required.

4 Claims, 5 Drawing Figures

METHOD OF SHAPING RING BLANKS

The present invention relates to metal shaping and may find application primarily for shaping raceway blanks on reelers.

It is known in the art to employ a method of shaping ring blanks which comprises deforming the blank with the aid of an outer roll and an inner roll both having profiled working surfaces identical to the outer and inner surfaces of the product and rotating and moving both rolls in a radial direction.

The foregoing known method is widely used for shaping raceway blanks, the deformation being effected by reducing the axial section of the blank. In this process, the roll disposed within the blank experiences considerable stresses and is hence limited in size and strength, which, naturally, reduces the durability of the tools and, more serious still, imposes limitations on the raceway shaping process; the method described can only be used to produce blanks in a limited range of sizes (for the same type of equipment) and the blanks have a poorly deformed structure.

It is an object of the present invention, therefore, to provide a method of shaping ring blanks permitting an appreciable reduction in the effort required to shape rings, e.g. raceways.

It is a further object of the present invention to provide an improved method of shaping ring blanks which would permit additional hardening of the material of the rings being shaped, thereby prolonging their service life.

It is another object of the present invention to provide a method of shaping rings conducive to a higher durability of the process equipment and also permitting an increase in the size range of rings which can be successfully shaped on one and the same type of equipment.

It is yet another object of the present invention to provide a method of shaping raceways offering a higher precision of ring shaping.

It is still another object of the invention to provide a method suitable for both hot and cold ring shaping offering certain advantages over the prior art processes of a similar kind.

And a final object of the present invention is to provide an improved method of shaping rings which would call for a minimal investment to be realized.

In accordance with the present invention, the foregoing and other objects are attained by a method of shaping ring blanks, whereby, to produce a ring blank with a generator wise non-uniform cross-section and having a prescribed profile on the inner cylindrical surface thereof, the initial blank is reduced on two sides with the aid of deforming tools. The proposed method is characterized in that the initial blank has a plain cylindrical inner surface and a preprofiled outer surface so selected that the outer profile is identical to said prescribed inner profile, and said deforming tools are so selected that the plain cylindrical inner surface is acted upon by a tool with acid prescribed profile whereas the outer surface is acted upon by a plain tool.

Such a method considerably reduces the effort needed to deform the initial ring blank in the course of shaping.

In accordance with one of the embodiments of the present invention, the method of shaping ring blanks is characterized in that the blank is produced by shaping the initial ring in a groove with the aid of an outer roll and an inner roll, rotating and moving both rolls in a radial direction, and having an inner surface of the initial ring identical in shape to the profiled working surface of the outer roll and an outer surface identical in shape to the working surface of the inner roll, so that the blank produced acquires a prescribed inner profile with a relatively smaller deformation effort.

In accordance with another embodiment of the present invention, the method of shaping ring blanks is characterized in that, in order to shape at least two rings simultaneously, the initial ring has an outer surface symmetrical with respect to the section along which the two rings are to be subsequently separated, each symmetrical section of the profile being identical in shape to the resultant inner profile of the respective individual ring.

The foregoing improved manipulations involved in the proposed method of shaping rings offer useful advantages over the prior art, namely:

the shaping procedure yields blanks whose fibers bend around the bearing race, making for a prolonged service life of the bearings;

the tools of the available equipment for hot shaping acquire additional durability, and the method is suitable for shaping raceways both larger and smaller than the sizes susceptible to the prior art methods;

in some cases (for thin-walled rings) semi-hot and cold rolling processes are feasible with their benefit of added precision; and in addition, the proposed method can be used in both open and closed shaping processes.

The present invention will be further understood from the following description of exemplary embodiments thereof taken in conjunction with the accompanying drawings, wherein FIG. 1 is a plan view showing the blank in section and subjected to open shaping by the method of the invention with the rolls shown in their initial position;

FIG. 2 is a plan view showing the blank in section and subjected to open shaping by the method of the invention with the rolls shown in their final position;

FIGS. 3a and b show plan views partially in section for a closed shaping process with the rolls in their initial and in their final positions, respectively, the blank having the same cross-sectional area;

Figures 1, 2:
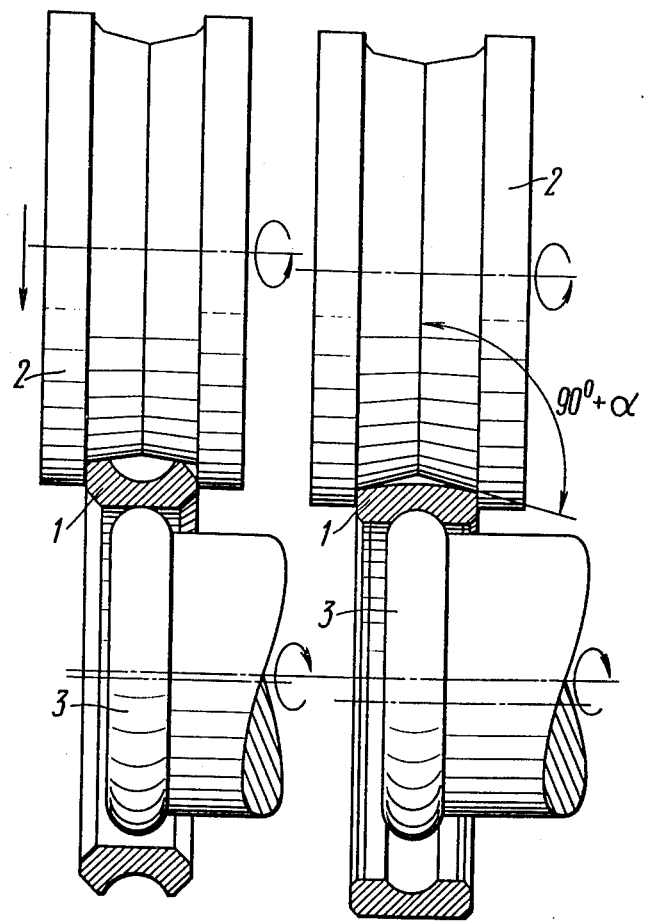
Figure 3:
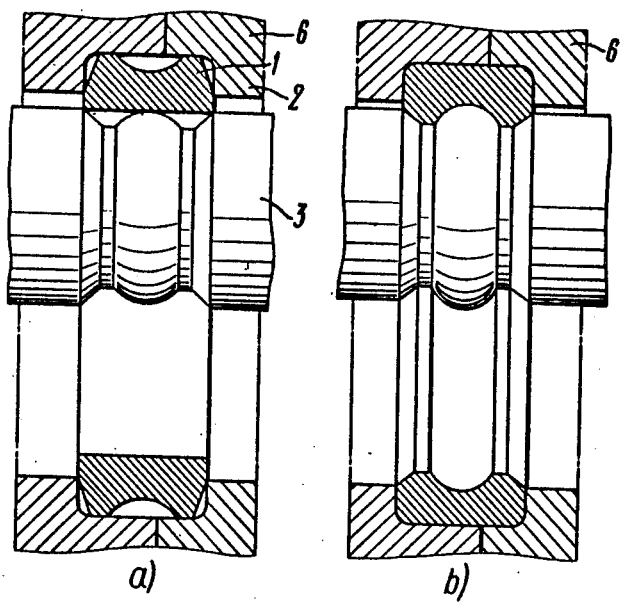

Referring now to the drawings, it will be seen that blank 1 (FIGS. 1 – 3a,b) is deformed by bending with the aid of an outer rolling tool (roll) 2 and an inner roll 3 which rotate and move towards each other. In order to improve the precision of shaping, the post-shaping elasticity of the blanks must be compensated for by turning the working surfaces of the outer and inner rolling tools through a certain angle α (FIG. 1) with respect to the plane in which the blank section undergoes bending in the course of shaping FIGS. 2 and 3b show the blank 1 in a free state after shaping.

Figures 4, 5:
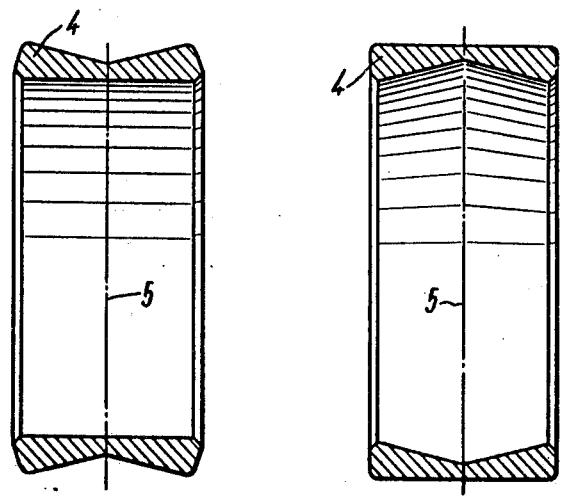
FIG. 4 illustrates a double-profile ring prior to shaping.
FIG. 5 illustrates the ring of FIG. 4 after shaping.

To shape rings having an asymmetric cross-section by the proposed method, it is recommended the a twin blank 4 (FIGS. 4 and 5), which is symmetrical with respect to the plane 5 in which the blank undergoes bending in the course of shaping, be used.

The initial blank 1 (FIG. 3a) is placed inside a die 6, whereupon the cambered roll 3 is fed from within in a helical trajectory, the roll 3 simultaneously turning about its own axis. The die 6 is made up of two halves. After the shaping procedure is over and the roll 3 is withdrawn from the blank 1 and positioned concentrically relative thereto, said die halves are drawn apart, the blank moving together with one of the half-dies and striking against a stationary pusher to be pressed out of the movable half-die.

To select the section of the initial blank, a wall thickness equal to the thicknesses of the post-shaping section must be added to the generator of the bore.

While manufacturing outer races 90 mm in diameter, a 24-ton effort is enough to effect cold deformation of the blanks to within 0.2 mm of the desired bore, e.g. quite suitable for subsequent grinding; whereas cold shaping of similar rings by a traditional method takes an effort of 35 tons.

In order to determine whether or not a given blank has been produced by the advanced process in accordance with the present invention, the following procedure is recommended. The blank, e.g. a shaped steel bush, may be cut by means of an abrasive wheel for making a templet. Macrostructural examination of the cutting plane will show that in the blanks produced by the method of this invention the metal fibers are disposed in parallel with the profile of the blank inner surface.

For raceways, such a structure ensures maximum durability as distinct from the structure obtained by the common radial shaping method in which the layers at the point where the cross-section tapers emerge on the surface of the profile at an angle of up to 10° to this surface. In products obtained by the proposed method, the fibers run around the profile surface without emerging thereon.

Thus, as follows from the accompanying drawings, the blank employed in the proposed method of ring blank shaping has an inner surface identical to the profiled working surface of the outer roll 2 and an outer surface identical to the profiled working surface of the inner roll 3. With such a blank, the shaping procedure is carried out by bending the axial section of the blank in the least-section zone, rather than by reducing the entire cross-section of the blank.

The proposed method of shaping reduces the load upon the inner roll and effects the shaping procedure in semi-hot and even cold states at the same load upon the inner roll.

So, the proposed method substantially increases the functional potential of the ring shaping process, predominantly as applied to raceways, and also improves the quality and durability of the products.

We claim:

1. A method of shaping ring blanks, such as raceways, to produce a ring blank or raceway having fibers which bend around the race and having a prescribed profile for the inner cylindrical surface thereof, comprising the step of: reducing the initial ring blank on two sides with the aid of deforming tools, the initial ring blank having a plain cylindrical inner surface and a preprofiled outer surface so selected that the outer profile is substantially identical to said prescribed inner profile, and said deforming tools being so selected that the plain cylindrical inner surface of the ring blank is acted upon by a tool having said prescribed profile whereas the outer surface of the blank is acted upon by a plain tool.

2. A method of shaping ring blanks as claimed in claim 1, further comprising the steps of: shaping the initial ring blank in a groove with the aid of an outer roll and an inner roll; and rotating and moving both rolls in a radial direction, the inner surface of the initial blank being similar in shape to the profiled working surface of the outer roll, and the outer surface of the blank being substantially identical in shape to the working surface of the inner roll, so that the blank produced acquires a prescribed inner profile with a relatively smaller deformation effort.

3. A method of shaping ring blanks as claimed in claim 1, further comprising the step of, providing for the simultaneous shaping of at least two rings by making the initial blank with an outer surface profile symmetrical with respect to the section along which the two rings are to be subsequently separated, and with each symmetrical section of the profile being identical in shape to the resultant inner profile of the respective individual ring.

4. A method of shaping ring blanks as claimed in claim 2, further comprising the step of compensating for the post-shaping elasticity of the blank by turning the working surfaces of said outer and inner rolls through a generally small predetermined acute angle $\alpha$ with respect to the plane in which the blank undergoes bending in the course of shaping same, thereby improving the precision of said shaping method.

* * * * *